United States Patent
Shimizu et al.

(10) Patent No.: US 9,649,578 B2
(45) Date of Patent: May 16, 2017

(54) SETTLING TANK AND METHOD OF OPERATING THE SAME

(71) Applicant: KURITA WATER INDUSTRIES LTD., Nakano-ku, Tokyo (JP)

(72) Inventors: Satoshi Shimizu, Tokyo (JP); Mitsuharu Terashima, Kitakyushu (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 69 days.

(21) Appl. No.: 14/441,408

(22) PCT Filed: Nov. 18, 2013

(86) PCT No.: PCT/JP2013/080995
§ 371 (c)(1),
(2) Date: May 7, 2015

(87) PCT Pub. No.: WO2014/080854
PCT Pub. Date: May 30, 2014

(65) Prior Publication Data
US 2015/0298028 A1    Oct. 22, 2015

(30) Foreign Application Priority Data
Nov. 20, 2012  (JP) ................................ 2012-254493

(51) Int. Cl.
| | | |
|---|---|---|
| *B01D 21/24* | (2006.01) | |
| *B01D 21/28* | (2006.01) | |
| *C02F 1/00* | (2006.01) | |

(52) U.S. Cl.
CPC ..... *B01D 21/2405* (2013.01); *B01D 21/2416* (2013.01); *B01D 21/286* (2013.01);
(Continued)

(58) Field of Classification Search
CPC ............ B01D 21/2405; B01D 21/2416; B01D 21/245; B01D 21/286; C02F 1/006
(Continued)

(56) References Cited

U.S. PATENT DOCUMENTS 1,741,187 A  *  12/1929  Fuqua ................ B01D 17/0208
                                              210/519
3,038,608 A  *   6/1962  Ochs ..................... C02F 1/5281
                                              210/801
(Continued)

FOREIGN PATENT DOCUMENTS

| JP | S54-018154 A | 2/1979 |
|---|---|---|
| JP | H10-202009 A | 8/1998 |

(Continued)

OTHER PUBLICATIONS

PCT, "International Search Report for International Application No. PCT/JP2013/080995", Dec. 2013.

*Primary Examiner* — Christopher Upton
(74) *Attorney, Agent, or Firm* — Manabu Kanesaka

(57) ABSTRACT

In a settling tank of the invention, treated water has good quality and whose operation is stable over a long period. A settling tank includes a tank body having a circular-cylindrical shape whose axial direction corresponds to the vertical direction, a distributor provided in a lower part (near the bottom) of the tank body, an outlet provided in a middle part or a part slightly above the middle part of a side face of the tank body, a receiving tank communicating with the tank body via the outlet, a stirring device provided in the tank body, a trough for extracting treated water provided in an upper part of the tank body, a sludge discharge port through which concentrated sludge is extracted from a lower part of the receiving tank, and so forth. A stirring member is provided below the distributor.

11 Claims, 4 Drawing Sheets

(52) U.S. Cl.
CPC ............... *C02F 1/00* (2013.01); *C02F 1/006* (2013.01); *C02F 2001/007* (2013.01)

(58) Field of Classification Search
USPC ........................................ 210/519, 801, 803
See application file for complete search history.

(56) References Cited

U.S. PATENT DOCUMENTS

| | | | | |
|---|---|---|---|---|
| 3,129,066 | A * | 4/1964 | Ambrogi | B01D 21/286 210/513 |
| 3,788,981 | A * | 1/1974 | Richard | B01D 21/2416 210/519 |
| 4,406,789 | A * | 9/1983 | Brignon | B01D 17/02 210/519 |
| 4,707,254 | A * | 11/1987 | Vellinga | C02F 1/006 210/519 |
| 5,075,001 | A * | 12/1991 | Taylor | B01D 21/2416 210/519 |
| 6,936,178 | B2 * | 8/2005 | Peloquin | B01D 21/2416 210/519 |

FOREIGN PATENT DOCUMENTS

| | | |
|---|---|---|
| JP | 2000-271407 A | 10/2000 |
| JP | 2000-334214 A | 12/2000 |
| JP | 2005-211817 A | 8/2005 |
| JP | 2006-075750 A | 3/2006 |

\* cited by examiner

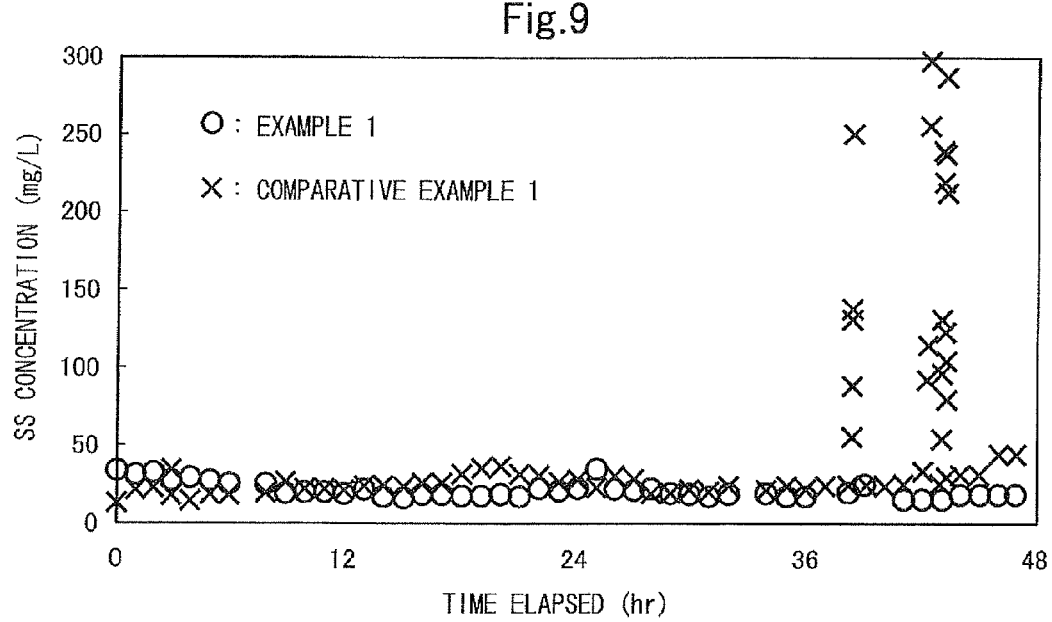

SETTLING TANK AND METHOD OF OPERATING THE SAME

FIELD OF INVENTION

The present invention relates to a settling tank such as a coagulating sedimentation tank and in particular to a settling tank including a sludge outlet provided in a side face of a tank body thereof. The present invention also relates to a method of operating the settling tank.

BACKGROUND OF INVENTION

Facilities such as an activated-sludge treatment facility and a coagulating-sedimentation treatment facility have employed, in general, sedimentation in which a solid-liquid separation tank (a settling tank) is used as means for separating sludge mixture into treated water and sludge. In such sedimentation, a sludge-blanket filtration method is employed in which a sludge zone (a sludge blanket layer) is formed in a sedimentation tank to obtain treated water having good quality by efficiently removing suspensoids and fine SS from the sludge mixture. The sludge mixture is made to flow into a portion below the sludge zone and to flow through the sludge zone, whereby the suspensoids and fine SS in the sludge mixture are filtered and separated from the mixture.

According to patent literature 1 and patent literature 2, floc-containing raw water is made to flow into a settling tank via an inlet provided in one side face of a tank body of the settling tank, and concentrated sludge is made to flow out of the tank body via an outlet provided in another side face of the tank body. According to patent literature 2, the mixture in the tank body is stirred by a stirring wheel.

According to patent literature 3, a reticular member is provided horizontally near a middle part of a tank body of a settling tank, floc-containing raw water is made to flow into a portion below the reticular member, and a sludge blanket is formed on the upper side of the reticular member. According to patent literature 3, some of the sludge in an upper-layer portion of the sludge blanket is made to flow out of the tank body via an outlet provided in a side face of the tank body.

According to patent literature 4, floc-containing raw water is made to flow from a distributor into a tank body, sludge accumulated in a lower portion of a sludge blanket is collected by using a rake provided below the distributor, and concentrated sludge is extracted from the bottom center of the tank body.

Compared with the settling tank according to patent literature 4 employing a concentrated-sludge-bottom-extracting method, the settling tank according to any of patent literatures 1 to 3 employing a side-discharge method in which sludge in the upper-layer portion of the sludge blanket is made to flow out of the tank body through a side face of the tank body has an advantage in that the deterioration in the quality of treated water due to a sudden rise of the blanket surface level is less likely to occur.

PATENT LITERATURES

Patent literature 1: Japanese Patent Publication 2006-75750 A
Patent literature 2: Japanese Patent Publication 2000-271407 A
Patent literature 3: Japanese Patent Publication 2005-211817 A
Patent literature 4: Japanese Patent Publication 10-202009 A

SUMMARY OF INVENTION

In a settling tank, such as the one disclosed by patent literature 1, in which floc-containing raw water is made to flow into a tank body through one side face of the tank body and sludge is made to flow out of the tank body via an outlet provided in another side face, sludge tends to sink to and accumulate at the bottom of the tank body. Such sediment of sludge tends to putrefy or ferment, generating gasses such as methane, hydrogen sulfide, nitrogen, hydrogen, and carbon dioxide. Such gases tend to adhere to the sludge and to make the sludge go up in the tank body and be mixed into supernatant water, deteriorating the quality of the supernatant water (treated water).

Regarding patent literature 2, although the mixture in the tank body is stirred, the diameter of the stirring wheel is small. Therefore, to stir the entirety of the sludge blanket so as to fully prevent the sedimentation of sludge, the number of revolutions of the stirring wheel needs to be increased significantly. In that case, flocs tends to be broken, deteriorating the quality of supernatant water.

Regarding patent literature 3, the floc-containing raw water is made to flow into the portion below the reticular member. Therefore, it is assumed that sludge blanket is less likely to be formed on the upper side of the reticular member than in the case disclosed by patent literature 1. Nevertheless, the reticular member tends to be clogged with flocs, reducing the operation stability. Particularly, if the reticular member is clogged partially, raw water rapidly flows through unclogged parts and goes upward. Therefore, such parts of the sludge blanket tend to form spouted beds, and the sludge tends to be mixed into supernatant water.

As described above, existing settling tanks employing sludge-side-outflow methods have problems in that the quality of treated water tends to be deteriorated and the operation stability tends to be insufficient.

The present invention is to solve the above problems and aims to provide a settling tank in which treated water has good quality and whose operation is stable over a long period. The present invention also provides a method of operating the settling tank.

A settling tank according to the present invention includes a tank body, a distributor for raw-water introduction provided in a lower part of the tank body, a stirring member provided between a bottom surface of the tank body and the distributor, a sludge outlet provided in a side of the tank body at a higher position than the distributor, a sludge-receiving chamber connected to the sludge outlet, and a sludge-discharging portion provided to the sludge-receiving chamber.

It is preferable that the stirring member be rotatably provided immediately above the bottom surface of the tank body.

It is preferable that the tank body have a circular-cylindrical shape, and a rotation diameter of the stirring member be 0.6 to 0.95 times a bore (diameter) of the circular-cylindrical tank body.

It is preferable that a height from the bottom surface of the tank body to a bottom surface of the distributor be 1 to 30% of a height from the bottom surface of the tank body to the sludge outlet.

A method of operating a settling tank according to the present invention is a method of operating the above settling tank and includes performing stirring such that a stirring intensity (G-value) of the stirring member in a space between the bottom surface of the tank body and the bottom surface of the distributor is 5 to 200 $s^{-1}$.

It is preferable that the distributor include a horizontal tubular portion provided with a liquid-outflow opening in a bottom surface of the horizontal tubular portion, the liquid-outflow opening extending in a longitudinal direction. It is also preferable that a difference between a specific gravity $d_1$ of liquid supplied to the distributor and a specific gravity $d_2$ of liquid in the tank body be 0.0001 to 0.1, and $d_2 > d_1$.

ADVANTAGEOUS EFFECTS OF INVENTION

In the settling tank according to the present invention, floc-containing raw water is introduced from the distributor into the lower part or a bottom part of the tank body, and is stirred by the stirring member, whereby flocs grow. The flocs (sludge) flow into the receiving chamber via the outlet provided on the side of the tank body, and are discharged via the sludge-discharging portion of the receiving chamber. In the settling tank according to the present invention, the stirring member is provided between the distributor and the bottom surface of the tank body. Therefore, sedimentation/stagnation of the sludge at the bottom of the tank body is prevented. Accordingly, the sludge is prevented from stagnating at the bottom of the tank body over a long period and undergoing putrefaction or fermentation. Hence, the sludge is prevented from floating upward because of adhesion of gases, such as methane gas and hydrogen sulfide gas, thereto. Consequently, treated water of good quality is obtained over a long period.

When the stirring member is provided immediately above the bottom surface of the tank body, the stagnation of sludge near the bottom surface of the tank body is more assuredly prevented.

When the tank body has a circular-cylindrical shape and the rotation diameter of the stirring member is as large as 0.6 to 0.95 times the bore (diameter) of the tank body, the stagnation of sludge is more assuredly prevented over the entirety of the bottom surface of the tank body.

When the height at which (the lower surface of) the distributor is positioned is as small as 1 to 30% of the height from the bottom surface of the tank body to the sludge outlet, flocs in the floc-containing raw water that flowing out of the distributor are fully filtered out by a sludge blanket. Consequently, treated water of good quality is obtained. Moreover, when the height at which the distributor is positioned is made small, the height at which the stirring member provided below the distributor is positioned also becomes small. Hence, the stagnation of sludge near the bottom surface of the tank body is more assuredly prevented.

When stirring is performed such that the G-value stirring intensity in the space between the distributor and the bottom surface of the tank body is 5 to 200 $s^{-1}$, the stagnation of sludge is more assuredly prevented. Moreover, the sludge is prevented from being broken. Consequently, treated water of good quality is obtained.

In one aspect of the present invention, the distributor includes the horizontal tubular portion. The liquid-outflow opening is provided in the bottom surface of the horizontal tubular portion and extends in the longitudinal direction. If raw water (treatment-object liquid) whose specific gravity is smaller by 0.0001 to 0.1 than the specific gravity of in-tank liquid in the settling tank (particularly, the specific gravity of the sludge blanket layer) is supplied into the distributor, the raw water flows along the ceiling surface of the distributor and in the longitudinal direction in the distributor because the specific gravity of the raw water is smaller than that of the in-tank liquid. Then, halfway down this passage, the raw water gradually flows out into the settling tank via the opening. The opening of the distributor is provided in the bottom surface of the distributor. Therefore, sludge does not accumulate in the distributor and flows out into the settling tank via the opening.

BRIEF DESCRIPTION OF DRAWINGS

FIG. 9 is a graph illustrating the results of examples.

DESCRIPTION OF EMBODIMENTS

Figure 1:
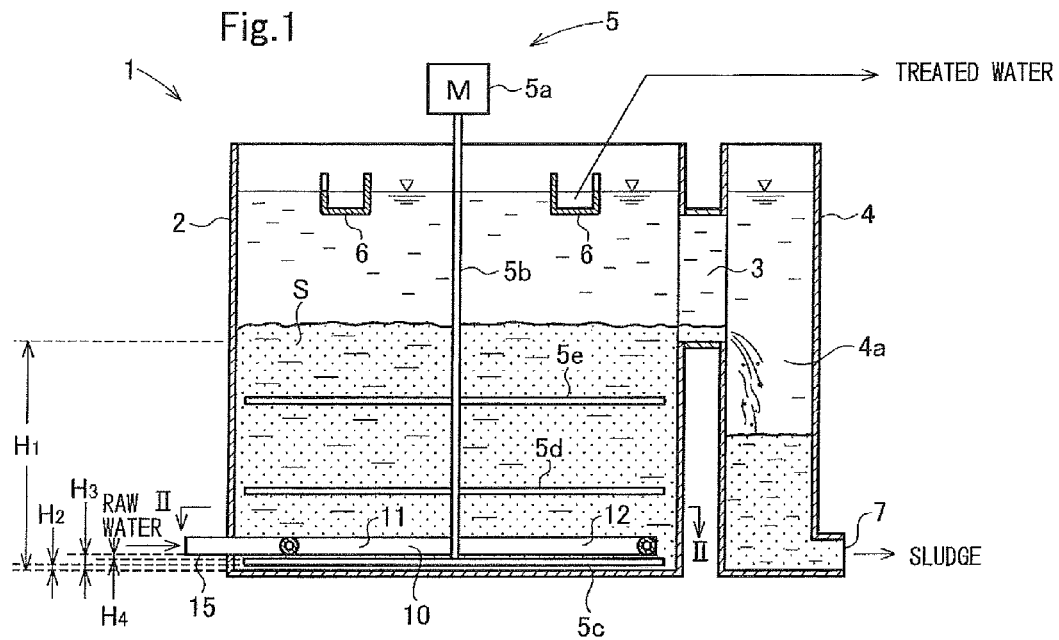
FIG. 1 is a vertical sectional view of a settling tank according to an embodiment.

An embodiment of the present invention will now be described with reference to FIGS. 1 to 4.

A settling tank 1 includes a tank body 2 having a circular-cylindrical shape whose axial direction corresponds to the vertical direction, a distributor 10 provided in a lower part (near the bottom) of the tank body 2, an outlet 3 provided in a middle part or a part slightly above the middle part of a side face of the tank body 2, a receiving tank 4 communicating with the tank body 2 via the outlet 3, a stirring device 5 provided in the tank body 2, a trough 6 for extracting treated water (supernatant water) provided in an upper part of the tank body 2, a sludge discharge port 7 via which concentrated sludge is extracted from a lower part of the receiving tank 4, and so forth. The space in the receiving tank 4 is denoted as receiving chamber 4a.

The stirring device 5 includes a driving machine 5a such as a motor, a rotating shaft 5b that extends vertically on the axis of the tank body 2 and is driven to rotate by the driving machine 5a, a first stirring member 5c attached to the lowermost end of the rotating shaft, and second and third stirring members 5d and 5e attached to respective positions higher than the first stirring member 5c. The third stirring member 5e is provided at a higher position than the second stirring member 5d. In this embodiment, the stirring members 5c to 5e are each a puddle wheel including blades extending radially from the rotating shaft 5b. While the stirring members 5c to 5e according to this embodiment extend in four radial directions, the stirring members 5c to 5e only need to extend in two or more radial directions, respectively.

The stirring member 5c is provided below the distributor 10. The stirring members 5d and 5e are provided above the distributor 10. The topmost stirring member 5e is positioned at a lower position than the lower edge of the outlet 3. A rotation diameter $D_2$ of the stirring members 5c to 5e is 0.6 to 0.95 times or preferably 0.8 to 0.95 times a bore (diameter) $D_1$ of the tank body 2.

Let the height from the bottom surface of the tank body 2 to the lower edge of the outlet 3 be $H_1$, the height from the bottom surface of the tank body 2 to the bottom surface of the stirring member 5c be $H_2$, and the height from the bottom surface of the tank body 2 to the bottom surface of the distributor 10 be $H_3$. Here, $H_2$ is preferably 5% or smaller or more preferably 3% or smaller of $H_1$. Preferably, $H_2$ is 10 mm or larger. A height $H_4$ from the bottom surface of the distributor 10 to the top surface of the stirring member 5c is preferably 20% or smaller or more preferably 10% or smaller of $H_3$. Preferably, $H_4$ is 10 mm or larger.

The distributor 10 according to this embodiment has a square-frame-like plan-view shape with a first side 11, a second side 12, a third side 13, and a fourth side 14. The sides 11 to 14 are each a circular-cylindrical pipe that provides a passage thereinside. A raw-water introduction pipe 15 is connected to a portion where one end of the first side 11 and one end of the fourth side 14 are connected to each other. The raw-water introduction pipe 15 extends in a direction of an extension of a diagonal of the distributor 10 having the square shape.

The bottom surfaces of the sides 11 to 14 of the distributor 10 each have an outflow opening 16 extending in the longitudinal direction of a corresponding one of the sides 11 to 14. In this embodiment, each of the sides 11 to 14 has one opening 16. The opening 16 extends from a position near one end of a corresponding one of the sides 11 to 14 to a position near the other end. The width of the opening 16 is uniform in the longitudinal direction of the corresponding side. Hence, in FIG. 4 as a bottom view of the distributor 10, the opening 16 has a long narrow rectangular shape. Note that the two ends of the opening 16 in the longitudinal direction may each have a round shape.

The sides 11 to 14 of the distributor 10 are each a straight circular-cylindrical pipe. The angle of opening (the angle of opening in the width direction of the opening 16 with respect to the center of the pipe) θ of the opening 16 provided in the bottom surface is 60° to 180° or preferably 90° to 150°.

A full length $L_1$ of each of the sides 11 to 14 of the distributor 10 is preferably about 50 to 90% or more preferably about 60 to 80% of the diameter $D_1$ of the tank body 2. A length $L_2$ of each of the openings 16 in the longitudinal direction is expressed as ($L_1 - 2 \times L_3$). Near each of the corners of the distributor 10 where adjacent ones of the sides 11 to 14 are connected to each other, the opening 16 is not present over an area defined by a distance $L_3$ from the tip of a corresponding one of the sides 11 to 14. Preferably, $L_3$ is about 1 to 3 times or more preferably about 1.2 to 2 times the bore (diameter) D of the pipe.

In the settling tank 1 including the distributor 10 configured as described above, raw water having a specific gravity that is smaller by 0.0001 to 0.1 preferably 0.0005 to 0.05 than the specific gravity of in-tank liquid in the settling tank 1 (the specific gravity of a sludge blanket if a sludge blanket layer is formed in the settling tank 1) is introduced into the distributor 10. The raw water flows along the ceiling surface of the distributor 10. Halfway down this passage, the raw water gradually flows out of the distributor 10 via the opening 16 into the settling tank 1. Since the central angle θ of the opening 16 is 60 to 180° or preferably 90 to 150°, sludge does not accumulate in the distributor 10. Moreover, the opening 16 is prevented from being clogged with sludge.

In this embodiment, the distributor 10 is bent by 90° near the corners of the distributor 10 where the sides 11 and 12, the sides 12 and 13, and the sides 13 and 14 meet. The flow in the distributor 10 is disturbed near each of the corners, particularly on the downstream side with respect to the corner. The sides 11 and 14 each branch off from the raw-water introduction pipe 15 at an angle of 45°. Therefore, the flow in the distributor 10 is disturbed near this point, particularly on the downstream side with respect to this point. In this embodiment, the opening 16 is not present in each of areas that are on the upstream side and on the downstream side within the distance $L_3$ from each corner. Hence, there is no chance that a large amount of raw water may flow out near the foregoing areas into the settling tank 1. Since the flow is disturbed near the corners (bent portions), sludge is prevented from accumulating near the corners (bent portions). The bent portions each correspond to a portion where a passage having a length of, for example, about five times the pipe bore D or smaller is bent by or is abruptly divided into branches at 45° or greater. In the case of the bent portion as the branching point, the downstream side with respect to the bent portion corresponds to the downstream side with respect to the branching point.

The raw water supplied from the distributor 10 into the tank body 2 is stirred by the stirring members 5c to 5e and is clarified by passing through a sludge blanket S, whereby treated water is obtained. The treated water flows out of the trough 6. Since suspended matter is attracted to flocs in the sludge blanket S, the surface level of the sludge blanket S gradually rises. When the surface level reaches the level of the outlet 3, the flocs in the sludge blanket S flow into the receiving chamber 4a via the outlet 3. Sludge stored and concentrated in the receiving chamber 4a is extracted via the discharge port 7.

Stirring with the stirring member 5c is preferably performed at a G-value stirring intensity of about 5 to 200 $s^{-1}$ or more preferably about 20 to 120 $s^{-1}$ in the space between the bottom surface of the tank body 2 and the bottom surface of the distributor 10. As an indicator representing the stirring intensity at which the above stirring and mixing with stirring blades is performed, the average velocity-gradient value (G-value) expressed by an equation given below is employed. The value is calculated on the basis of the size, the number of blades, and the number of revolutions of the stirring wheel.

$$G = \sqrt{(g \cdot w / \mu)}$$

g: gravitational acceleration (=9.8) (m/s²)
w: amount of work per unit time and unit volume (kg·m/m³·s)
μ: viscosity coefficient of water (kg/m·s)

When stirring is performed at this stirring intensity, sludge is prevented from stagnating near the bottom surface of the tank body 2.

Since sludge does not stagnate near the bottom surface of the tank body 2, putrefaction or fermentation of the sludge is prevented. Consequently, gases such as methane and hydrogen sulfide are not generated. Hence, the rise of the sludge level due to adhesion of such gases thereto is prevented, and treated water of good quality is obtained.

Stirring with the stirring members 5e and 5d is preferably performed at a G-value stirring intensity of about 1 to 80 $s^{-1}$ or more preferably about 2 to 30 $s^{-1}$ in the space between the distributor 10 and the lower edge of the outlet 3. Stirring at this stirring intensity accelerates the growth of flocs in the sludge blanket layer.

To prevent putrefaction of the sludge in the sludge blanket S, raw water is preferably supplied such that its linear ascending velocity in the tank body 2 becomes 5 to 60 m/hr or more preferably 7 to 20 m/hr.

[Another Embodiment]

In the distributor 10 according to the above embodiment, each of the openings 16 extends continuously in the longitudinal direction of a corresponding one of the sides 11 to 14. Alternatively, a plurality of discontinuous openings 16 may be provided on each side. In that case also, the width of each opening is uniform in the longitudinal direction of the opening. Note that the openings are preferably arranged at regular intervals on each side.

In each of the following embodiments also, discontinuous openings may be provided.

In the above embodiment, the raw-water introduction pipe 15 is connected to the point where the sides 11 and 14 of the distributor 10 meet. Alternatively, the raw-water introduction pipe 15 may be connected to a halfway point of one side 11, as in a distributor 10A illustrated in FIG. 5. In that case, no opening 16 is provided near the connection between the raw-water introduction pipe 15 and the side 11.

Figure 5:
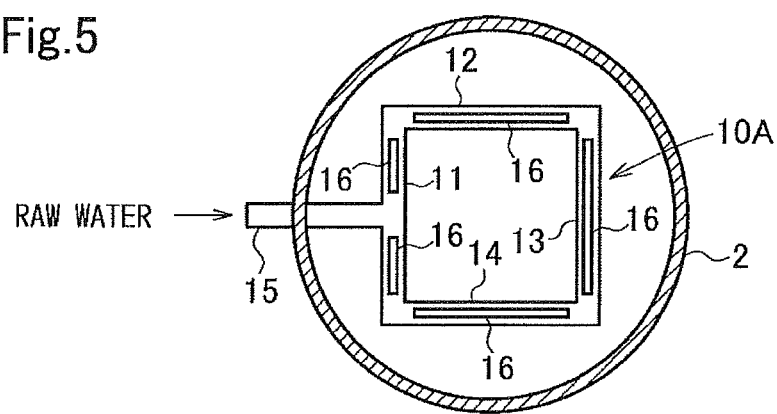
FIG. 5 is a bottom view of a distributor included in a settling tank according to another embodiment.
Figure 6:
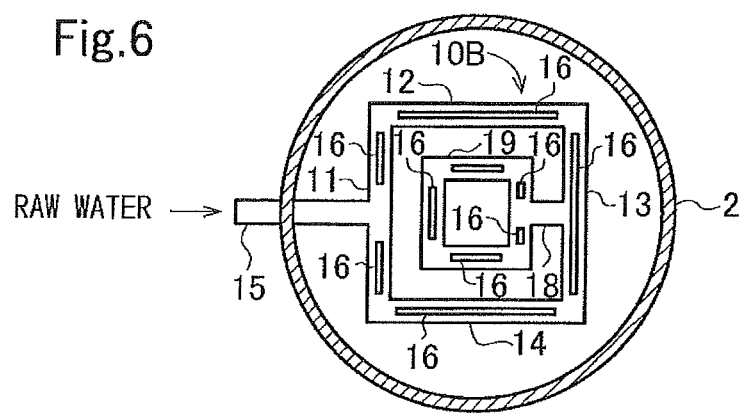
FIG. 6 is a bottom view of a distributor included in a settling tank according to yet another embodiment.

In the present invention, as in a distributor 10B illustrated in FIG. 6, the distributor 10A illustrated in FIG. 5 may include a square-looped pipe 19 communicating with the side 13 via a pipe 18, thereby having a double-looped shape in plan view. The square-looped pipe 19 is also provided with openings 16 in the lower surface thereof. Note that no openings 16 are provided near bent portions at the four corners of the square-looped pipe 19 and near the connection to the pipe 18.

Figure 7:
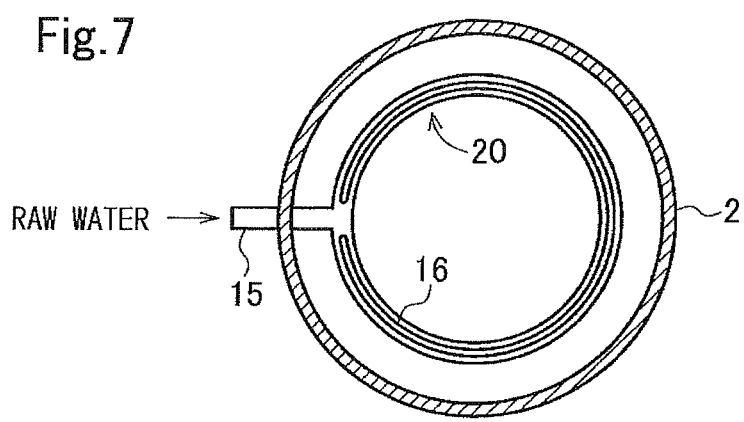
FIG. 7 is a bottom view of a distributor included in a settling tank according to yet another embodiment.

A distributor 20 illustrated in FIG. 7 has a circular ring shape in plan view. An opening 16 is provided over the entirety of the bottom surface of the distributor 20, excluding a portion near the connection between the raw-water introduction pipe 15 and the distributor 20.

Figure 8:
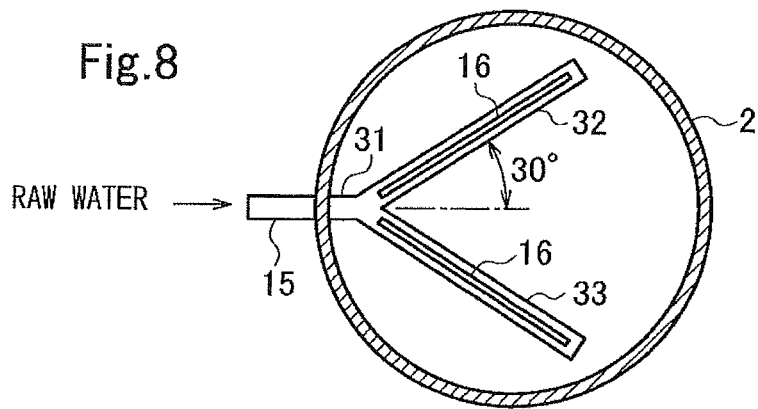
FIG. 8 is a bottom view of a distributor included in a settling tank according to yet another embodiment.

A distributor 30 illustrated in FIG. 8 includes three straight pipes 31, 32, and 33 extending in three respective radial directions. One of the pipes, specifically, the pipe 31, is shorter than the other pipes 32 and 33. The raw-water introduction pipe 15 is connected to the tip of the pipe 31. In this embodiment, the angle at which the pipes 32 and 33 meet is 60°. The angle of the direction in which water flows from the branching point into each of the pipes 32 and 33 with respect to the pipe 31 is 30°, which is smaller than 45°. Therefore, the portion where the pipes 31, 32, and 33 meet does not correspond to the bent portion. Hence, an opening 16 extends over the entirety of the bottom surface of each of the pipes 32 and 33.

In the distributor 30 illustrated in FIG. 8, the tips of the respective straight pipes 32 and 33 are closed.

Figure 2:
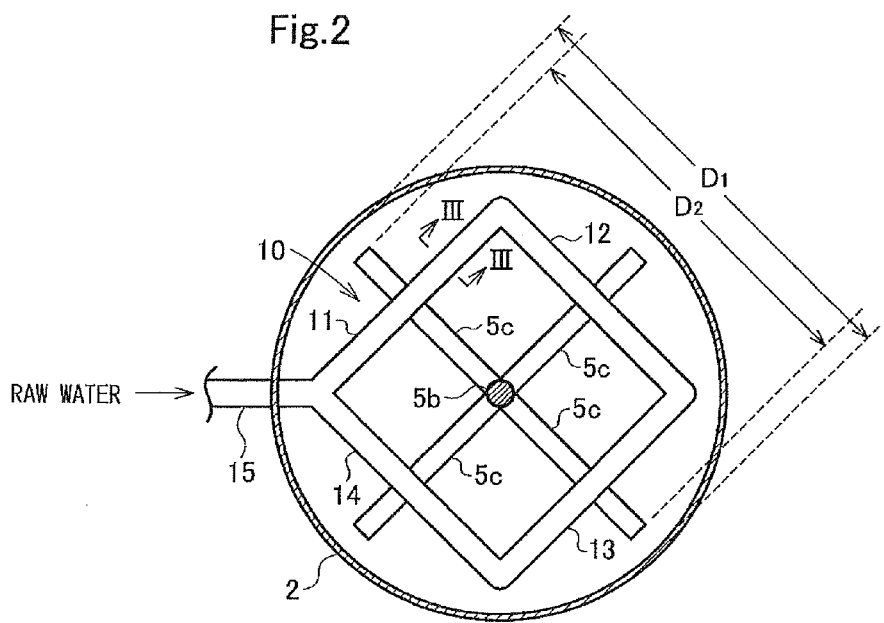
FIG. 2 is a sectional view taken along line II-II illustrated in FIG. 1.
Figure 3:
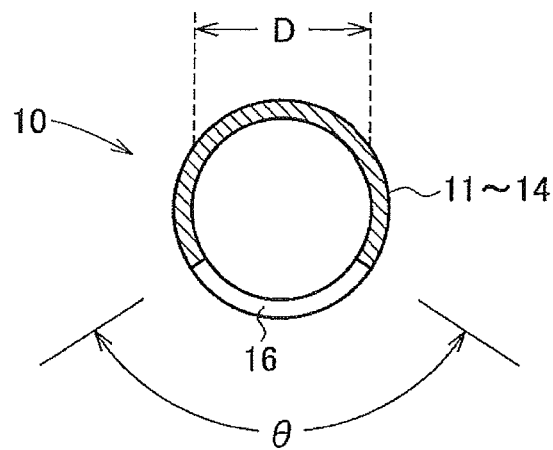
FIG. 3 is a sectional view taken along line illustrated in FIG. 2.
Figure 4:
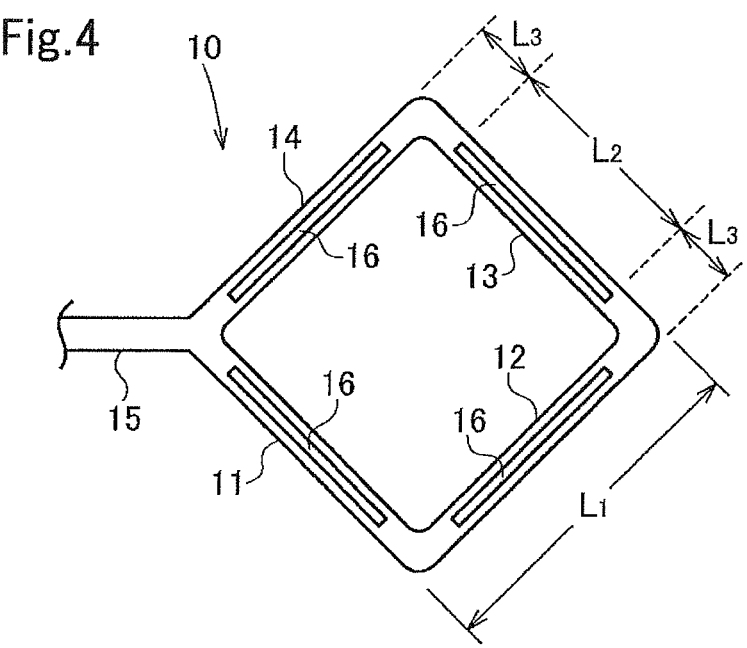
FIG. 4 is a bottom view of a distributor.

Among the distributors described above, those illustrated in FIGS. 2, 5, and 8 are easy to manufacture and are therefore preferable. The distributors 10 and 10A illustrated in FIGS. 2 and 5 are preferable because raw water tends to flow out evenly via the openings 16.

EXAMPLES

An example and a comparative example will now be described.

Example 1

Using the tank illustrated in FIGS. 1 to 4 and configured as described below, raw water having the following quality was treated.

<Quality of Raw Water>
 SS concentration: 100 mg/L
 pH: 7.3
 Difference in specific gravity from that of in-tank liquid: 0.017

<Configuration of Settling Tank>
 Size: 1500 mm of diameter, 1500 mm of height
 Horizontal length of stirring wheel: 1.35 m (0.9 times tank bore)
 $H_1$: 0.8 m
 $H_2$: 0.03 m (4% of $H_1$)
 $H_3$: 0.09 m (11% of $H_1$)
 $H_4$: 0.015 m (17% of $H_3$)

<Chemicals and Dosages>
 Aluminum sulfate: 300 mg/L
 Cationic polymer: 1 mg/L (Kurifarm PC728 of Kurita Water Industries, Ltd.)
 Anionic polymer: 3 mg/L (Kurifarm PA465 of Kurita Water Industries, Ltd.)

<Operating Conditions>
 Water-flow LV: 15 m/hr
 Stirring intensity (G-value):
 30 $s^{-1}$ in area extending from upper surface of distributor to lower end of outlet
 88 $s^{-1}$ in space between lower surface of distributor and bottom of tank FIG. 9 illustrates changes in the concentration of SS in treated water that were observed over time.

Comparative Example 1

Using an apparatus that is the same as that used in Example 1 except that the stirring device 5 is not provided, raw water was treated under the same conditions. FIG. 9 illustrates changes in the concentration of SS in treated water that were observed over time.

[Review]

As graphed in FIG. 9, in Example 1, treated water containing SS of 50 mg/L or less was obtained stably for two consecutive days. In contrast, in Comparative Example 1, when about 38 hours had elapsed and when about 43 hours had elapsed, air bubbles were generated in sludge accumulated at the bottom, the air bubbles caused lumps of sludge to float upward, and the quality of treated water was worsened to a SS concentration of 300 mg/L. These results show that stable treated water is obtained by stirring the sludge below the distributor as in Example 1.

While the present invention has been described in detail as specific embodiments, it is obvious to those skilled in the art that various changes can be made to the embodiments without departing from the object and the scope of the present invention.

The present application is based on Japanese Patent Application No. 2012-254493 filed on Nov. 20, 2012, the content of which is incorporated herein by reference in its entirety.

The invention claimed is:

1. A settling tank, comprising:
 a tank body;
 a distributor for raw-water introduction provided in a lower part of the tank body;
 a first stirring member rotatably provided immediately above a bottom surface of the tank body and between the bottom surface of the tank body and the distributor;
 a second stirring member provided above the distributor;
 a sludge outlet provided in a side of the tank body at a higher position than the distributor;
 a sludge-receiving chamber connected to the sludge outlet; and a sludge-discharging portion provided to the sludge-receiving chamber, wherein a height $H_3$ from the bottom surface of the tank body to a bottom surface of the distributor is 1 to 30% of a height $H_1$ from the bottom surface of the tank body to the sludge outlet, and the distributor includes a horizontal tubular portion provided with a liquid-outflow opening in a bottom surface of the horizontal tubular portion.

2. The settling tank according to claim 1, wherein the tank body has a circular-cylindrical shape, and a rotation diameter of the first stirring member and the second stirring member is 0.6 to 0.95 times a bore (diameter) of the circular-cylindrical tank body.

3. A method of operating the settling tank according to claim 1, comprising:

performing stirring such that a stirring intensity (G-value) of the first stirring member in a space between the bottom surface of the tank body and the bottom surface of the distributor is 5 to 200 $s^{-1}$.

4. The method of operating the settling tank according to claim 3, wherein a difference between a specific gravity $d_1$ of liquid supplied to the distributor and a specific gravity $d_2$ of liquid in the tank body is 0.0001 to 0.1, and $d_2 > d_1$.

5. The settling tank according to claim 1, wherein a height $H_2$ from the bottom surface of the tank body to a bottom surface of the first stirring member is 5% or smaller of the height $H_1$ and is 10 mm or larger.

6. The settling tank according to claim 1, further comprising a raw-water introduction pipe for introducing the raw-water into the tank body, wherein the tubular water feed member of the distributor includes four straight pipes connected to each other to form the rectangular shape, each having the liquid-outflow opening with a same length, and one corner of the rectangular shape is connected to the raw-water introduction pipe.

7. The settling lank according to claim 1, further comprising a raw-water introduction pipe for introducing the raw-water into the tank body, wherein the horizontal tubular portion of the distributor has a ring shape, and the liquid-outflow opening extends an entirety of the bottom surface of the distributor excluding a connection portion between the raw-water introduction pipe and the distributor.

8. The settling tank according to claim 1, further comprising a raw-water introduction pipe for introducing the raw-water into the tank body, wherein the horizontal tubular portion of the distributor includes a first pipe having one end connected to the raw-water introduction pipe, a second pipe having one end connected to another end of the first pipe and another end being closed, the second pipe including the liquid-outflow opening extending from said one end to said another end, and a third pipe having one end connected to said another end of the first pipe and another end being closed, the third pipe including another liquid-outflow opening extending from said one end to said another end thereof.

9. The settling tank according to claim 1, further comprising a raw-water introduction pipe for introducing the raw-water into the tank body, wherein the horizontal tubular portion of the distributor includes first, second, third, and fourth straight pipes connected to each other to form a rectangular shape, the liquid-outflow opening includes a first opening, and a second opening having a length less than that of the first opening, each of the first, second, and third straight pipes includes the first opening, the fourth straight pipe has two of the second openings, and the raw-water introduction pipe is connected to the fourth straight pipe between the two second openings.

10. The settling tank according to claim 9, wherein the distributor further includes a square-looped pipe arranged such that the first, second, third, and fourth straight pipes surround the square-looped pipe, and a side pipe connecting the square-looped pipe to one of the four straight pipes, the square-looped pipe includes one side having two short openings facing the first stirring member, and three sides each having a long opening facing the first stirring member and having a length greater than that of the short opening, and the distributor is structured such that the raw-water enters the tank body from the raw-water introduction pipe and flows out from the first openings of the first, second, and third straight pipes, the two second openings of the fourth straight pipe, and the two short openings and the long openings of the square-looped pipe.

11. The settling tank according to claim 1, further comprising a receiving tank disposed adjacent to the tank body and having said sludge-receiving chamber therein, the receiving tank being open at an upper portion and communicating with the sludge outlet so that sludge in the tank body gradually flows to the receiving tank together with treated water through the sludge outlet.

\* \* \* \* \*